US011499478B2

(12) United States Patent
Judd et al.

(10) Patent No.: US 11,499,478 B2
(45) Date of Patent: Nov. 15, 2022

(54) ASYMMETRIC INLET PARTICLE SEPARATOR FOR GAS TURBINE ENGINE

(71) Applicant: HONEYWELL INTERNATIONAL INC., Charlotte, NC (US)

(72) Inventors: Zedic Judd, Phoenix, AZ (US); John Pearson, Phoenix, AZ (US); Douglas Hollingshead, Phoenix, AZ (US); Bradley Tucker, Phoenix, AZ (US); Yogendra Sheoran, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 37 days.

(21) Appl. No.: 16/952,921

(22) Filed: Nov. 19, 2020

(65) Prior Publication Data

US 2022/0154641 A1    May 19, 2022

(51) Int. Cl.
*F02C 7/052*    (2006.01)
*B01D 45/16*    (2006.01)

(52) U.S. Cl.
CPC .............. *F02C 7/052* (2013.01); *B01D 45/16* (2013.01); *F05D 2260/607* (2013.01)

(58) Field of Classification Search
CPC .... F02C 7/04; F02C 7/045; F02C 7/05; F02C 7/052; B01D 45/16; F05D 2260/607
See application file for complete search history.

(56) References Cited

U.S. PATENT DOCUMENTS

| 4,713,934 | A | * | 12/1987 | Pellow ................... B64D 33/02 55/306 |
| 5,725,180 | A | * | 3/1998 | Charnay .................. F02C 7/04 244/53 B |
| 6,508,052 | B1 | | 1/2003 | Snyder et al. |
| 7,678,165 | B2 | | 3/2010 | Tingle et al. |
| 7,802,433 | B2 | | 9/2010 | Higgins |
| 7,927,408 | B2 | | 4/2011 | Sheoran et al. |
| 8,945,254 | B2 | | 2/2015 | Mayer et al. |

(Continued)

FOREIGN PATENT DOCUMENTS

| EP | 3211204 A1 | 8/2017 |
| EP | 3561265 A1 | 10/2019 |
| GB | 2509886 A | 7/2014 |

OTHER PUBLICATIONS

Duffy, Robert J., et al., "Integral Engine Inlet Particle Separator.", vol. II—Design Guide, Aug. 1975.

(Continued)

*Primary Examiner* — Steven M Sutherland
(74) *Attorney, Agent, or Firm* — Lorenz & Kopf, LLP

(57) ABSTRACT

An asymmetric inlet particle separator for a gas turbine engine includes an inlet having a first cross-sectional shape, and a duct downstream of the inlet. The duct includes a bend upstream from a splitter, a scavenge branch and an engine airflow branch. The splitter is outside of a line of sight from the inlet and the splitter separates the scavenge branch from the engine airflow branch. The asymmetric inlet particle separator includes an annulus downstream of the engine airflow branch configured to be coupled to the gas turbine engine. The annulus has a second cross-sectional shape, and the engine airflow branch transitions from the first cross-sectional shape to the second cross-sectional shape.

20 Claims, 5 Drawing Sheets

(56) References Cited

U.S. PATENT DOCUMENTS

| | | | |
|---|---|---|---|
| 9,314,723 B2 | 4/2016 | Judd et al. | |
| 9,631,554 B2 | 4/2017 | Howe et al. | |
| 9,638,103 B2 | 5/2017 | Howe et al. | |
| 10,054,050 B2 | 8/2018 | Labrecque et al. | |
| 10,087,839 B2 | 10/2018 | Gekht et al. | |
| 10,138,904 B2 | 11/2018 | Pearson et al. | |
| 10,400,670 B2 | 9/2019 | Kiszewski | |
| 10,513,979 B2 | 12/2019 | Renninger et al. | |
| 10,724,436 B2 | 7/2020 | Mayer et al. | |
| 10,738,699 B2 | 8/2020 | Burnside | |
| 10,767,558 B2 | 9/2020 | Smith, III et al. | |
| 10,767,559 B2 | 9/2020 | Smith, III et al. | |
| 10,774,788 B2 | 9/2020 | Feulner | |
| 2011/0226675 A1 | 9/2011 | Holden et al. | |
| 2016/0177824 A1* | 6/2016 | Ponton | F02C 7/052 |
| | | | 60/39.092 |
| 2016/0312698 A1* | 10/2016 | Judd | F02C 7/052 |
| 2017/0370287 A1 | 12/2017 | Pearson et al. | |

OTHER PUBLICATIONS

Zedan M. et al, "Viscous Flow Analysis of Advanced Particle Separators", Journal of Propulsion and Power, NTRS-NASA Technical Reports Server, US, vol. 8, No. 4, Jul. 1, 1992, pp. 843-848, XP000281786.

\* cited by examiner

ASYMMETRIC INLET PARTICLE SEPARATOR FOR GAS TURBINE ENGINE

TECHNICAL FIELD

The present disclosure generally relates to gas turbine engines, and more particularly relates to an asymmetric particle separator for a gas turbine engine.

BACKGROUND

Gas turbine engines may be employed to power various devices. For example, a gas turbine engine may be employed to power a mobile platform, such as an aircraft, rotorcraft, etc. In the example of the gas turbine engine powering a mobile platform, during the operation of the gas turbine engine, air from the atmosphere is pulled into the gas turbine engine and used to generate energy to propel the mobile platform. In certain operating environments, such as desert operating environments, the air in the atmosphere may contain sand and dust particles. Due to the particle size of the sand and dust particles, these particles tend to follow the airflow through the gas turbine engine, and may be ingested by the turbine. The ingestion of the sand and dust particles may accumulate in cooling circuits associated with the gas turbine engine, which may reduce a cooling performance of the components. In addition, in certain examples, the mobile platform may have reduced space for the gas turbine engine, and thus, reduced space for a particle separator to be associated with it.

Accordingly, it is desirable to provide an inlet particle separator, which separates sand and dust particles from the air from the atmosphere that is drawn into the gas turbine engine. In addition, it is desirable to provide an asymmetric inlet particle separator, which is not positioned entirely about a centerline of the gas turbine engine to provide a space savings. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is an asymmetric inlet particle separator for a gas turbine engine. The asymmetric inlet particle separator includes an inlet having a first cross-sectional shape, and a duct downstream of the inlet. The duct includes a bend upstream from a splitter, a scavenge branch and an engine airflow branch. The splitter is outside of a line of sight from the inlet and the splitter separates the scavenge branch from the engine airflow branch. The asymmetric inlet particle separator includes an annulus downstream of the engine airflow branch configured to be coupled to the gas turbine engine. The annulus has a second cross-sectional shape, and the engine airflow branch transitions from the first cross-sectional shape to the second cross-sectional shape.

The first cross-sectional shape is rectangular, and the second cross-sectional shape is annular. The inlet further comprises a bellmouth defined about a perimeter of the inlet. The duct includes a ramp surface downstream of the inlet and upstream of the bend. The duct narrows to a throat at the bend, the bend is defined by an angle of about 70 degrees to about 110 degrees and the bend defines a tortuous path to the splitter from the inlet. The asymmetric inlet particle separator includes a secondary flow source in fluid communication with the scavenge branch configured to draw air with entrained particles into the scavenge branch. The inlet is elliptical, and has a minor axis that is oblique to a vertical axis defined along a diameter of the annulus. The annulus defines an annulus centerline, and at least the inlet is offset from and asymmetric relative to the annulus centerline.

Also provided is a gas turbine engine having a centerline. The gas turbine engine includes an inlet particle separator that is asymmetric relative to the centerline. The inlet particle separator includes an inlet spaced apart and offset from the centerline, and a duct downstream of the inlet. The duct includes a bend upstream from a splitter to define a tortuous path from the inlet to the splitter, a scavenge branch and an engine airflow branch. The splitter separates the scavenge branch from the engine airflow branch. The inlet particle separator includes an annulus downstream of the engine airflow branch, and the annulus is positioned about the centerline.

The inlet has a first cross-sectional shape, the annulus has a second cross-sectional shape, and the engine airflow branch transitions from the first cross-sectional shape to the second cross-sectional shape. The first cross-sectional shape is rectangular, and the second cross-sectional shape is annular. The inlet further comprises a bellmouth defined about a perimeter of the inlet. The duct includes a ramp surface downstream of the inlet and upstream of the bend, the duct narrows to a throat at the bend and the bend is defined by an angle of about 70 degrees to about 110 degrees. The gas turbine engine includes a secondary flow source in fluid communication with the scavenge branch configured to draw air with entrained particles into the scavenge branch. The inlet is elliptical, and has a minor axis that is oblique to a vertical axis defined along a diameter of the annulus. The splitter is outside of a line of sight of the inlet.

Further provided is a gas turbine engine having a centerline. The gas turbine engine includes an inlet particle separator that is asymmetric relative to the centerline. The inlet particle separator includes an inlet spaced apart and offset from the centerline. The inlet has a first cross-sectional shape. The inlet particle separator includes a duct downstream of the inlet. The duct includes a bend upstream from a splitter to define a tortuous path from the inlet to the splitter such that the splitter is hidden from the inlet, a scavenge branch and an engine airflow branch. The splitter separates the scavenge branch from the engine airflow branch. The inlet particle separator includes a secondary flow source in fluid communication with the scavenge branch configured to draw air with entrained particles into the scavenge branch. The inlet particle separator includes an annulus downstream of the engine airflow branch, the annulus positioned about the centerline and having a second cross-sectional shape, and the engine airflow branch transitions from the first cross-sectional shape to the second cross-sectional shape.

The first cross-sectional shape is rectangular, and the second cross-sectional shape is annular. The duct includes a ramp surface downstream of the inlet and upstream of the bend. The inlet is elliptical, and has a minor axis that is oblique to a vertical axis defined along a diameter of the annulus.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
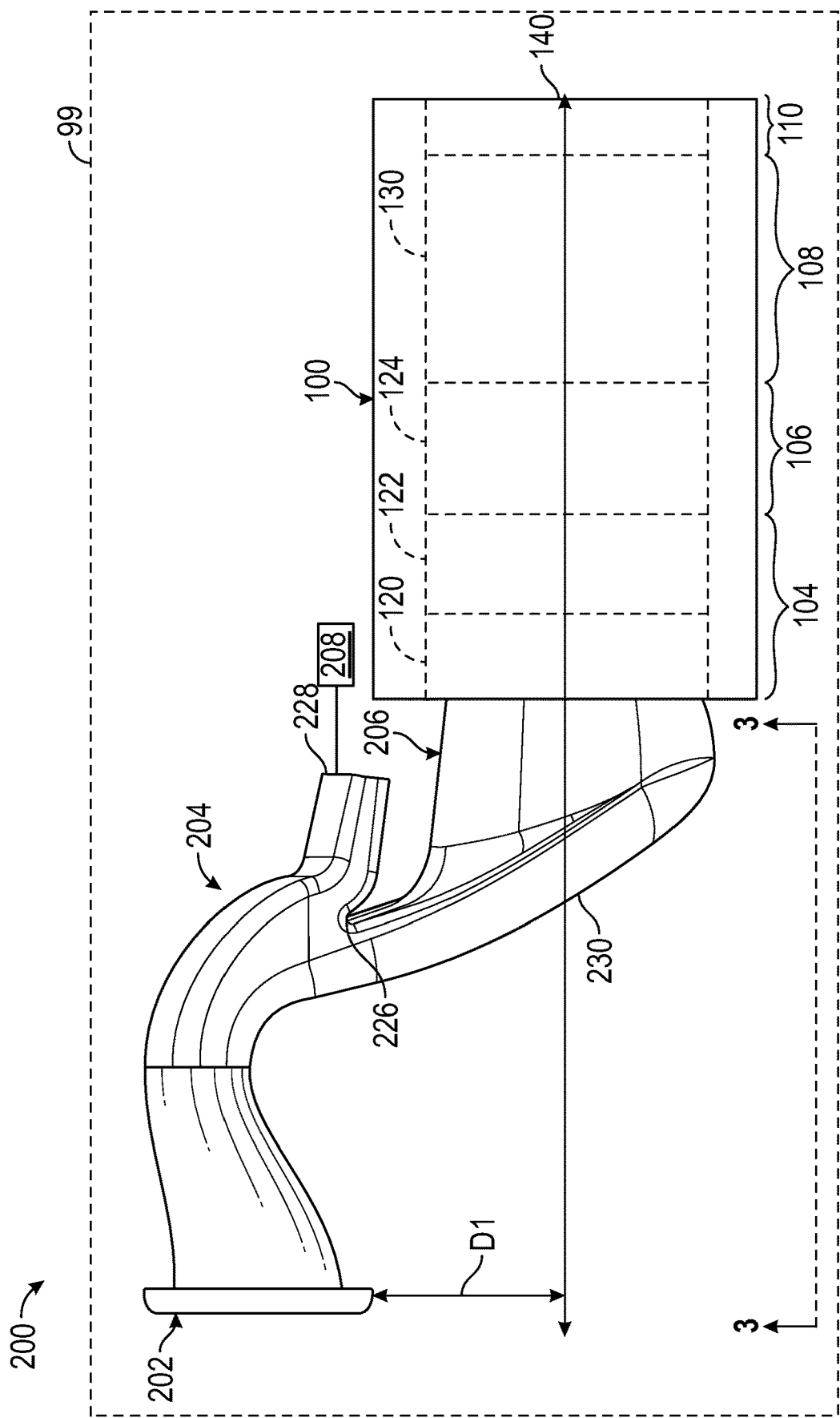
FIG. 1 is a schematic illustration of a gas turbine engine, which includes an exemplary asymmetric inlet particle separator in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from an asymmetric inlet particle separator and the use of the asymmetric inlet particle separator with a gas turbine engine described herein is merely one exemplary embodiment according to the present disclosure. In addition, while the asymmetric inlet particle separator is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a schematic view of an exemplary gas turbine engine 100 is shown, which includes an inlet particle separator or an asymmetric inlet particle separator 200. The gas turbine engine 100 is axisymmetric about a longitudinal axis or centerline 140, which also comprises an axis of rotation for the gas turbine engine 100. In the depicted embodiment, the gas turbine engine 100 is an annular turboshaft gas turbine engine within a rotorcraft 99, although other arrangements and uses may be provided. As will be discussed herein, the gas turbine engine 100 is coupled to the asymmetric inlet particle separator 200 for removing fine sand and dust particles from atmospheric air drawn into the gas turbine engine 100 during operation. In this example, the asymmetric inlet particle separator 200 is configured to remove at least about 75% of particles sized from about 0 to about 1000 micrometers (μm). It should be noted that in other implementations of the asymmetric inlet particle separator 200, with different gas turbine engines 100, for example, the asymmetric inlet particle separator 200 may remove a larger percentage of particles. The removal of the fine sand and dust particles by the asymmetric inlet particle separator 200 improves an operating life of components associated with the gas turbine engine 100, and reduces an accumulation of fine sand and dust particles within cooling conduits associated with the gas turbine engine 100, such as cooling conduits associated with a turbine section 108, etc. In addition, by being asymmetric and not extending entirely about the centerline 140 of the gas turbine engine 100, the asymmetric inlet particle separator 200 fits within a small area of the rotorcraft 99, which reduces drag and provides a weight savings.

In this example, with reference back to FIG. 1, the gas turbine engine 100 also includes a compressor section 104, a combustor section 106, the turbine section 108, and an exhaust section 110. The compressor section 104 is coupled to and in fluid communication with the asymmetric inlet particle separator 200. The compressor section 104 includes an inlet guide vane 120 and a radial compressor 122. In other embodiments, the number of compressors in the compressor section 104 may vary. In the depicted embodiment, the inlet guide vane 120 directs the air received from the asymmetric inlet particle separator 200 to the radial compressor 122, which raises the pressure of the air and directs a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes at least one turbine 130. However, it will be appreciated that the number of turbines, and/or the configurations thereof, may vary. In this embodiment, the high-temperature air from the combustor section 106 expands through and rotates the turbine 130. As the turbine 130 rotates, the turbine 130 drives equipment in the gas turbine engine 100 via concentrically disposed shafts or spools. In one example, the turbine 130 drives the radial compressor 122 via a powershaft 138 (FIG. 2) and further drives other components associated with the rotorcraft 99 such as a rotor, etc. The combustive gases are exhausted via the exhaust section 110.

In this example, the asymmetric inlet particle separator 200 is coupled to the gas turbine engine 100 so as to be upstream from the inlet guide vane 120. The asymmetric inlet particle separator 200 includes an inlet 202, a duct 204, an annulus 206 and a secondary flow source 208. The asymmetric inlet particle separator 200 may be composed of a metal or metal alloy, and may be formed via casting, additive manufacturing, such as direct metal laser sintering (DMLS), etc. In one example, the inlet 202, the duct 204 and the annulus 206 are integrally formed, one-piece or monolithic. In one example, the inlet 202, the duct 204 and the annulus 206 are composed of a metal or metal alloy, and are formed using additive manufacturing. In other examples, the inlet 202, the duct 204 and the annulus 206 may be cast. In yet other examples, the inlet 202, the duct 204 and the annulus 206 may be separately formed and coupled together via welding, mechanical fasteners, etc. As shown in FIG. 1, the inlet 202 and the duct 204 are offset or spaced apart from the longitudinal axis or centerline 140 of the gas turbine engine 100. The inlet 202 and the duct 204 are asymmetrical with regard to the longitudinal axis or centerline 140 of the gas turbine engine 100. The annulus 206 is positioned about the centerline 140 of the gas turbine engine 100, but is also asymmetrical with regard to the longitudinal axis or centerline 140. Thus, the asymmetric inlet particle separator 200 is asymmetrical relative to the longitudinal axis or centerline 140 of the gas turbine engine 100.

In one example, the inlet 202 is spaced a distance D1 from the longitudinal axis or centerline 140. The distance D1 is about six inches to about sixteen inches, and may be about ten inches to twelve inches. The distance D1 is predetermined to enable the air to flow through the asymmetric inlet particle separator 200 with reduced pressure losses. Generally, the distance D1 is predetermined based on a location of the gas turbine engine 100 within the rotorcraft 99. The distance D1 is predetermined to enable the airflow to pass through the asymmetric inlet particle separator 200 and turn into the gas turbine engine 100, which is nested within the rotorcraft 99 (FIG. 1). The asymmetric inlet particle separator 200 utilizes the flow path turn to supply the airflow to the nested gas turbine engine 100, and the flow path turn defined by the asymmetric inlet particle separator 200 utilizes particle inertia to separate particles prior to the airflow reaching the gas turbine engine 100.

Figure 2:
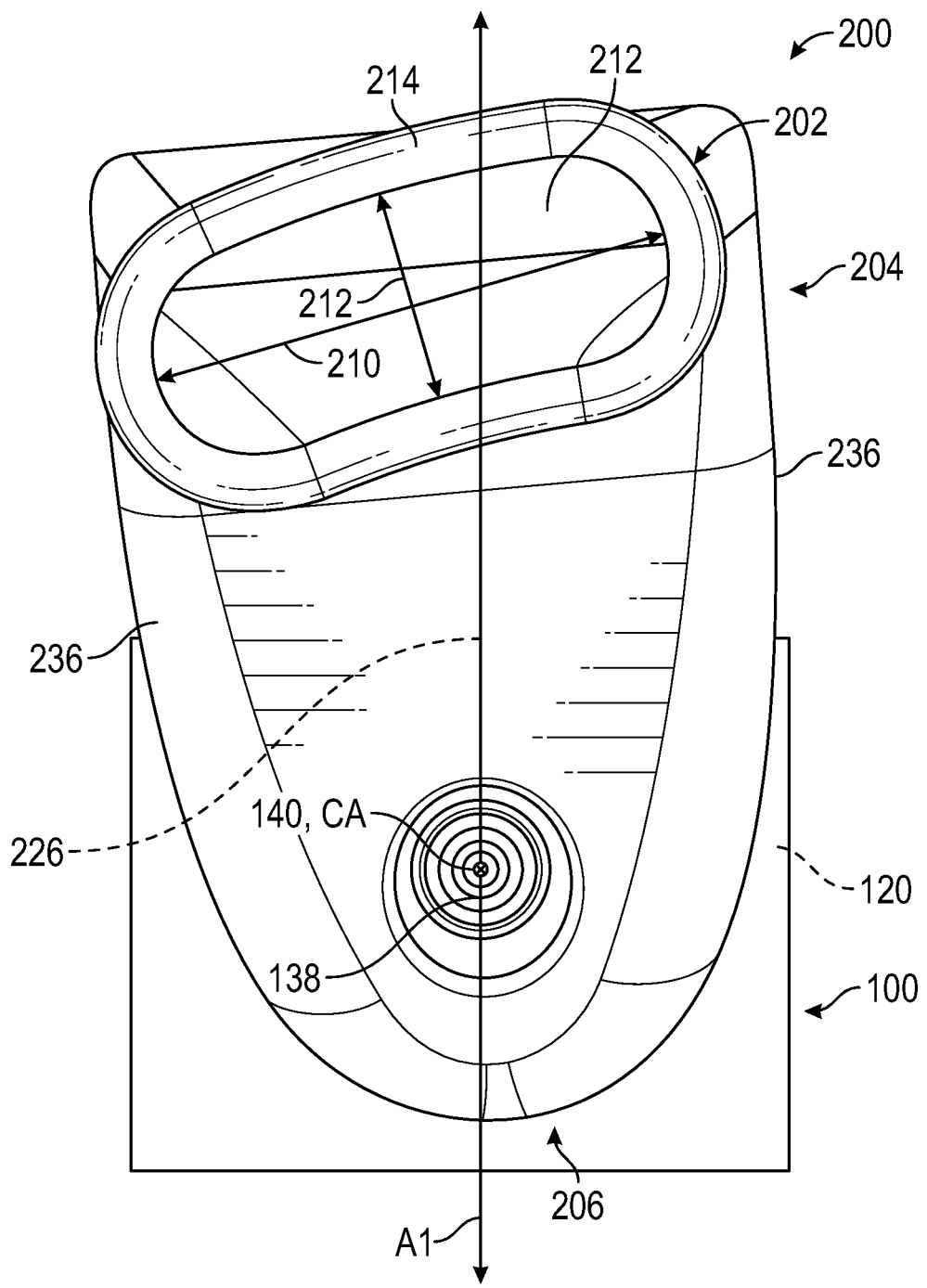
FIG. 2 is an end view of the asymmetric inlet particle separator and the gas turbine engine of FIG. 1.

The inlet 202 is positioned so as to be disposed on one side of the gas turbine engine 100 and is offset from the centerline 140 of the gas turbine engine 100 (FIG. 1). Stated another way, the inlet 202 is configured so as to not be positioned annularly about the centerline 140 of the gas turbine engine 100 or does not surround the centerline 140 of the gas turbine engine 100. Rather, the inlet 202 is positioned so as to be offset from or spaced a distance apart from the longitudinal axis or centerline 140 of the gas turbine engine 100 and upstream from the compressor section 104. In this example, the inlet 202 is substantially elliptical in shape, as shown in FIG. 2. With reference to FIG. 2, the inlet 202 has a major axis 210 and a minor axis 212. The major axis 210 is offset from the centerline 140, and the minor axis 212 is substantially perpendicular to the centerline 140. The inlet 202 may be twisted relative to a vertical axis A1 defined along a diameter of the annulus 206, such that the minor axis 212 is transverse or oblique to the vertical axis A1. Generally, the geometry of the inlet 202 may be angled or otherwise positioned as needed to properly interface with an airframe or external assembly associated with the rotorcraft 99. The inlet 202 is also twisted or curved relative to the centerline 140. The inlet 202 may include a bellmouth 214 defined about a perimeter of the inlet 202 to guide air into the asymmetric inlet particle separator 200.

Figure 3:
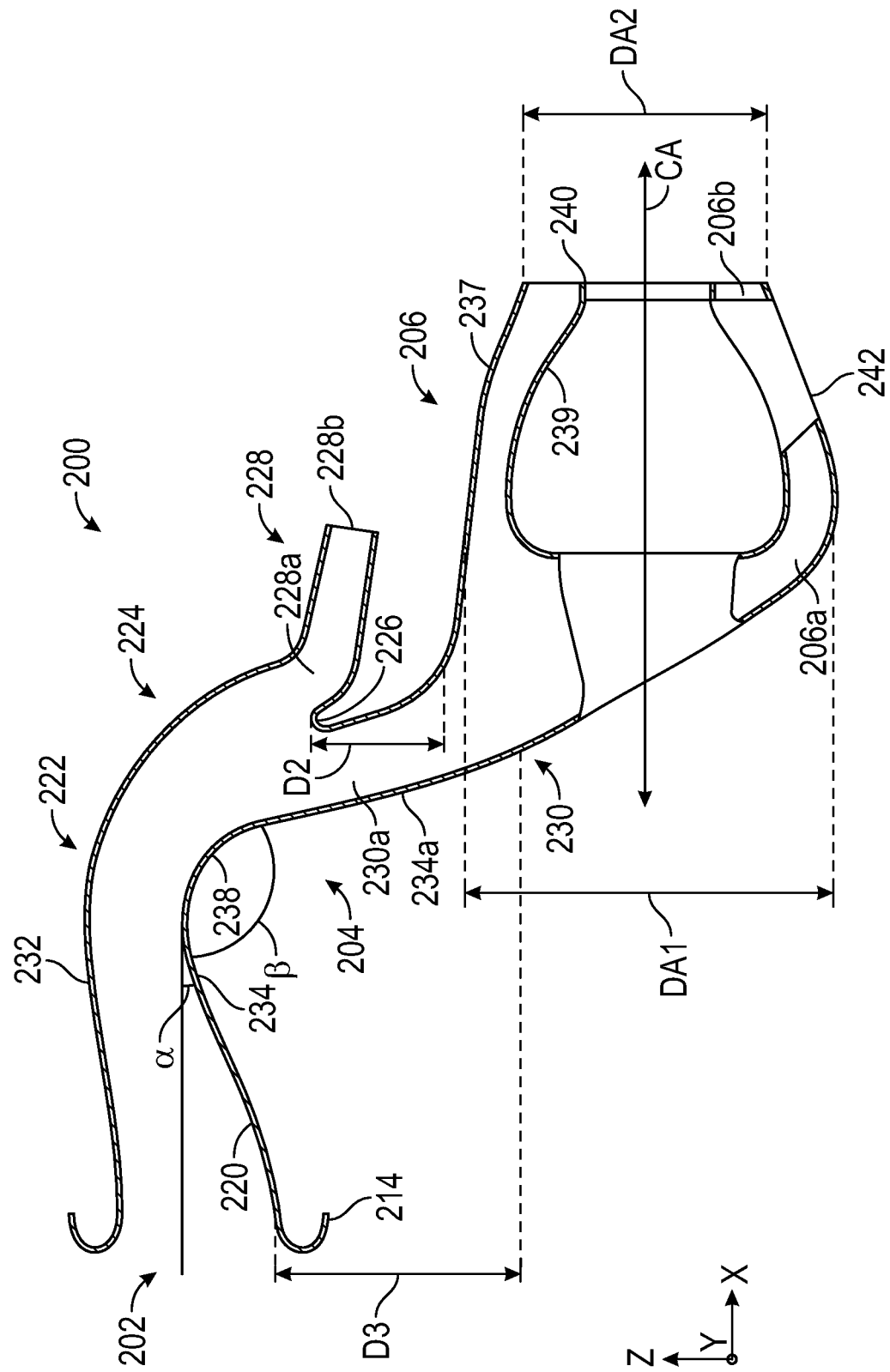
FIG. 3 is a cross-sectional view of the asymmetric inlet particle separator taken along line 3-3 of FIG. 1.

The duct 204 is integrally formed with and in fluid communication with the inlet 202. With reference to FIG. 3, the duct 204 couples or interconnects the inlet 202 with the annulus 206. The duct 204 includes a ramp surface 220, a throat 222, a transition section 224, a splitter 226, a scavenge branch 228 and an engine airflow branch 230. The duct 204 is bounded by an outer wall 232, an inner wall 234 opposite the outer wall 232 and opposing sidewalls 236 (FIG. 2). Generally, the duct 204 transitions from a first cross-section, which is rectangular, to second cross-section, which is annular, along a length of the duct 204. The duct 204 has the rectangular or first cross-section along the ramp surface 220, the throat 222, the transition section 224 and the scavenge branch 228, and transitions from the rectangular or first cross-section to the annular or second cross-section along the engine airflow branch 230. The ramp surface 220 is fluidly coupled to the inlet 202 and is downstream of the inlet 202. The ramp surface 220 extends at an angle α of about 10 to about 40 degrees. The angle α is defined between the ramp surface 220 and a line extending along a center of the inlet 202. The ramp surface 220 accelerates the particles entrained in the air that is drawn in through the inlet 202.

The throat 222 is downstream of the ramp surface 220. The throat 222 defines a bend 238 in the duct 204. Generally, the duct 204 narrows from the ramp surface 220 to the throat 222, and turns at the bend 238 at the throat 222 and flows to the transition section 224. In one example, the bend 238 is defined at an angle β of about 70 degrees to about 110 degrees. The angle β is defined between the ramp surface 220 and the engine airflow branch 230 along an outer surface 234a of the inner wall 234. The narrowing of the duct 204 at the throat 222 causes the particles accelerated by the ramp surface 220 to follow along an outer wall 232 of the duct 204. Generally, the bend 238 at the throat 222 causes air with entrained particles of all sizes (coarse particles greater than 100 micrometers (μm), mid-range particles 20-100 μm, and fine particles less than 20 μm) to gather near and along the outer wall 232, and flow into the downstream scavenge branch 228. Air devoid of particles tends to follow the bend 238 at the throat 222 and flow along the inner wall 234 of the duct 204 to the downstream engine airflow branch 230.

The transition section 224 interconnects the throat 222, the scavenge branch 228 and the engine airflow branch 230. The duct 204 widens at the transition section 224 so that the curved shape of the outer wall 232 can provide favorable rebound angles to assist in directing larger particles (particles greater than 100 μm) into the scavenge branch 228. In this regard, the transition section 224 widens toward the scavenge branch 228 so that larger particles that contact the inner wall 234 downstream of the bend 238 will rebound toward the outer wall 232 prior to reaching the splitter 226. In addition, the transition section 224 provides finer particles (less than 20 μm) more time to reach the outer wall 232 prior to reaching the splitter 226.

The splitter 226 is downstream from the transition section 224. With brief reference to FIG. 2, the splitter 226 is hidden from the inlet 202 or there is no line of sight between the inlet 202 and the splitter 226. Stated another way, the bend 238 at the throat 222 defines a tortuous path to the splitter 226, which directs the particles entrained in the air into the scavenge branch 228. By placing the splitter 226 hidden or outside of the line of sight of the inlet 202, finer particles (less than 20 µm) have more time to reach the outer wall 232 prior to reaching the splitter 226, and particles larger than 20 µm are inhibited from initially striking on a side of the splitter 226 facing the engine airflow branch 230 after entering the inlet 202. In this example, the splitter 226 is defined as a sharp bend or knee in the duct 204 downstream of the transition section 224, which serves to separate the scavenge branch 228 from the engine airflow branch 230. Generally, the splitter 226 extends inwardly between the scavenge branch 228 and the engine airflow branch 230 and cooperates with the outer wall 232 to define an inlet 228a to the scavenge branch 228. The splitter 226 cooperates with the inner wall 234 to define an inlet 230a for the engine airflow branch 230.

The scavenge branch 228 is defined between the splitter 226 and the outer wall 232 downstream from the transition section 224. The scavenge branch 228 also includes a scavenge outlet 228b in fluid communication with the secondary flow source 208, as will be discussed. The scavenge branch 228 is fluidly isolated from the annulus 206 or is not in fluid communication with the annulus 206. The scavenge branch 228 is generally rectangular in cross-section just downstream of splitter 226 (see FIG. 4), however, the scavenge branch 228 may have any desired shape or transition to other shapes further downstream. The scavenge branch 228 is spaced apart from and fluidly isolated from the engine airflow branch 230. Generally, the scavenge branch 228 receives the particles as the particles follow along the outer wall 232 and separates the particles from the airflow entering the gas turbine engine 100. The separated particles may be removed via a valve, or exhausted by the secondary flow source 208 out of the rotorcraft 99 (FIG. 1), for example.

The engine airflow branch 230 is defined between the splitter 226 and the inner wall 234 downstream of the transition section 224. The engine airflow branch 230 is fluidly coupled to the annulus 206, and transitions from being substantially rectangular in cross-section to annular in cross-section to correspond with a diameter of the annulus 206 (see also FIG. 4). Generally, the engine airflow branch 230 transitions to the annular in cross-section a distance D2 downstream from the splitter 226 and downstream from the scavenge branch 228. The distance D2 is predetermined to reduce pressure losses as the airflow transitions from the rectangular cross-section to the annular cross-section. In one example, the distance D2 is about two inches to about six inches. In addition, the engine airflow branch 230 is spaced a distance D3 from the inlet 202. The distance D3 is also predetermined to reduce pressure losses as the airflow turns around the bend 238 and transitions from the rectangular cross-section to the annular cross-section. In one example, the distance D3 is about zero inches to about five inches. It should be noted that these values of the distance D2 and the distance D3 are merely examples, as the distance D2 and the distance D3 may be scaled accordingly depending upon the size of the gas turbine engine 100. The engine airflow branch 230 directs the airflow, which is substantially devoid of particles, to the annulus 206.

The annulus 206 is downstream of the engine airflow branch 230, and is fluidly coupled to the compressor section 104 of the gas turbine engine 100 (FIG. 1). The annulus 206 is annular in cross-section, and includes an annulus inlet 206a fluidly coupled to the engine airflow branch 230 and an annulus outlet 230b fluidly coupled to the inlet guide vane 120 (FIG. 1) of the gas turbine engine 100 (FIG. 1). In one example, a diameter of the annulus 206 changes or is tapered from the annulus inlet 206a to the annulus outlet 206b.

Figure 4:
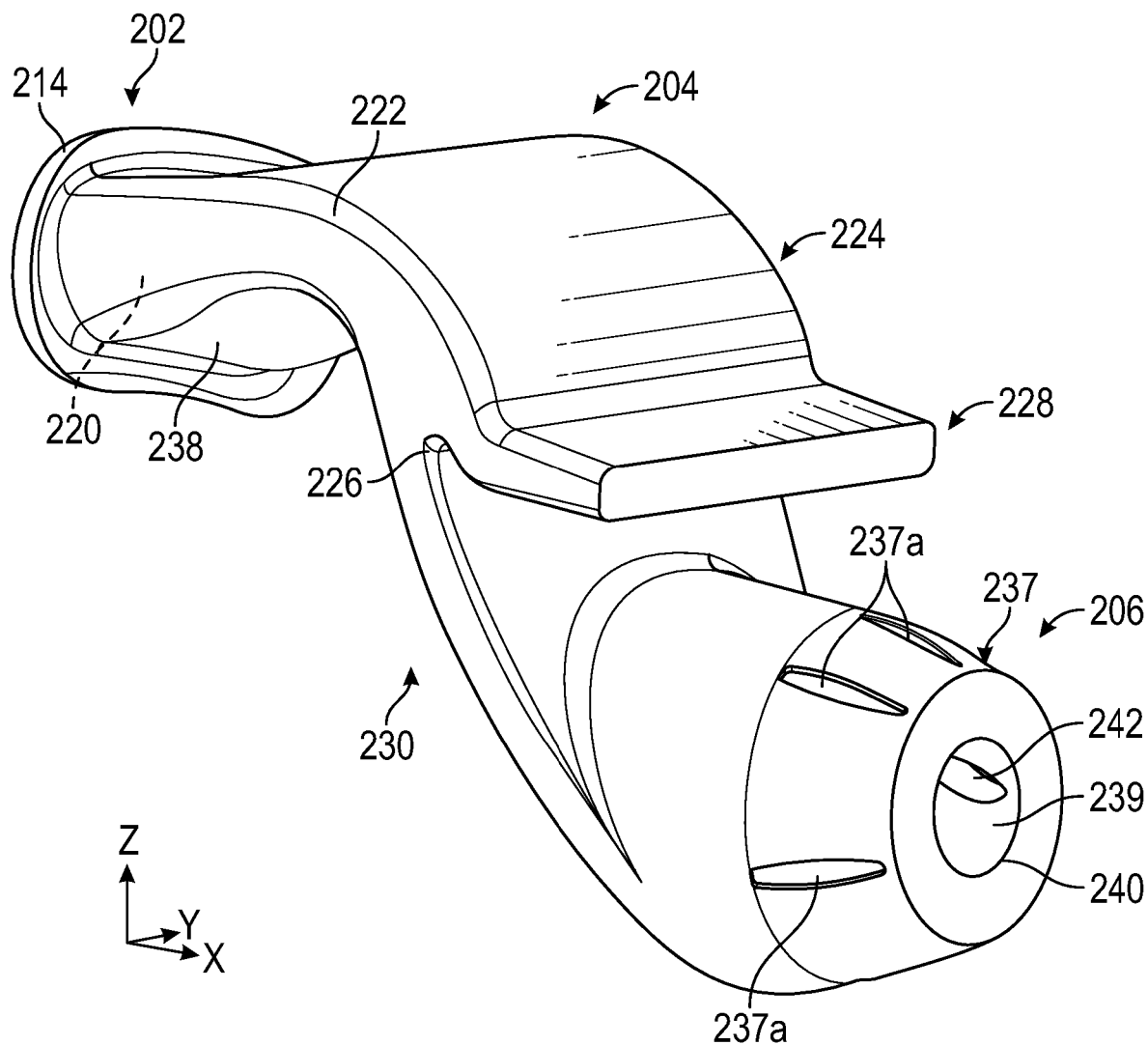
FIG. 4 is a rear perspective view of the asymmetric inlet particle separator.

Stated another way, a diameter DA1 of the annulus 206 proximate the annulus inlet 206a is different and greater than a diameter DA2 of the annulus 206 at the annulus outlet 206b. The taper of the annulus 206 assists in directing the airflow into the gas turbine engine 100 (FIG. 1) with reduced pressure losses and reduced flow distortion. The annulus 206 includes an outer annular sidewall 237 that is spaced apart from an inner annular sidewall 239. The outer annular sidewall 237 and the inner annular sidewall 239 cooperate to direct the airflow from the engine airflow branch 230 to the inlet guide vane 120 (FIG. 1) of the gas turbine engine 100 (FIG. 1). With reference to FIG. 4, the outer annular sidewall 237 may also include one or more struts 237a, which assist in coupling or connecting the outer annular sidewall 237 to the inner annular sidewall 239 and supporting the inner annular sidewall 239 within the annulus 206. The struts 237a may be spaced apart about a perimeter or circumference of the annulus 206. It should be noted, however, that while the annulus 206 is described and illustrated herein as tapering from the annulus inlet 206a to the annulus outlet 206b, in certain embodiments, the annulus 206 may not be tapered, such that the diameter of the annulus inlet 206a is the same as the diameter of the annulus outlet 206b. In other embodiments, the annulus 206 may have a reverse taper, such that the diameter of the annulus inlet 206a is less than the diameter of the annulus outlet 206b.

Figure 5:
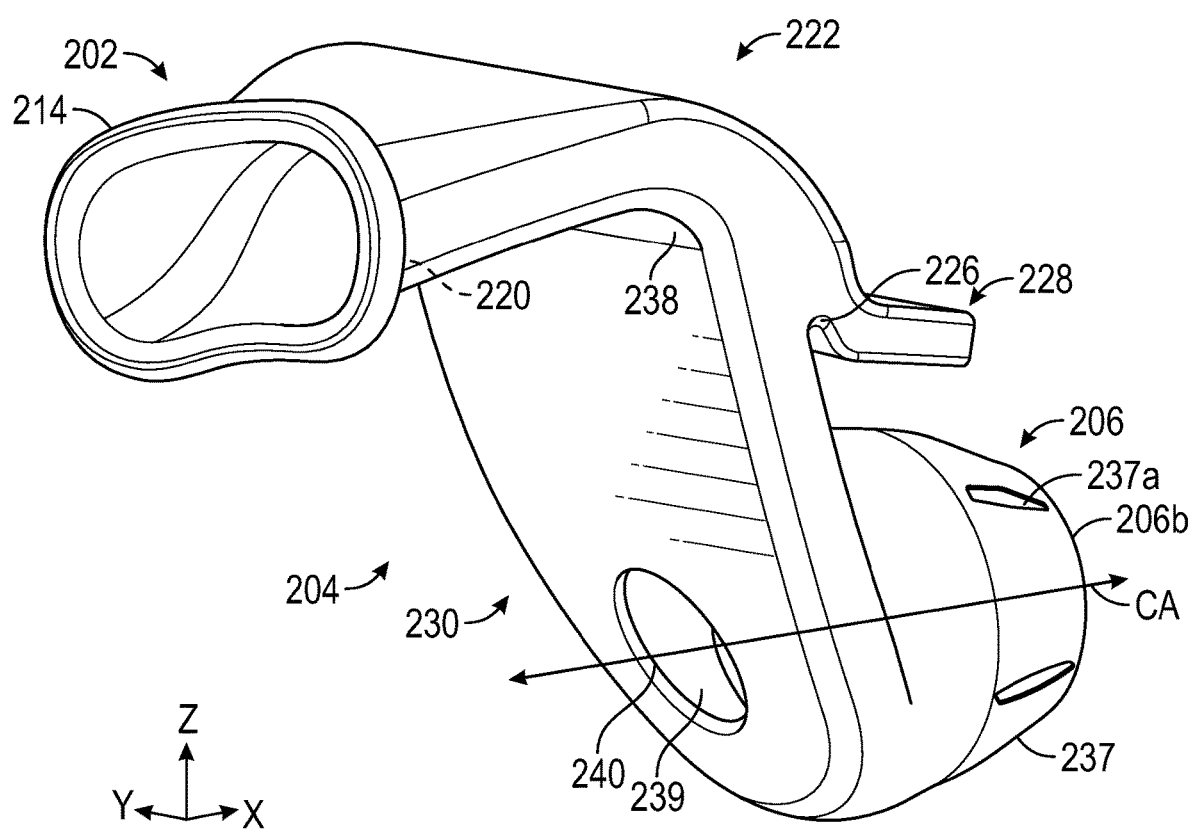
FIG. 5 is a front perspective view of the asymmetric inlet particle separator.

In one example, with reference to FIGS. 4 and 5, the annulus 206 defines an opening 240, which is sized to enable the annulus 206 to be positioned about the powershaft 138 (FIG. 2) and to be fluidly coupled to the inlet guide vane 120 (FIG. 1). In this example, the opening 240 extends along an annulus centerline CA (FIGS. 2 and 5), which is parallel to and colinear with the longitudinal axis or centerline 140 of the gas turbine engine 100 (FIG. 1). The inlet 202 is offset from and asymmetric relative to the annulus centerline CA. In addition, the duct 204 is asymmetric relative to the annulus centerline CA. The annulus 206 also defines a coupling recess 242, which receives a coupling flange 244 (FIG. 1) for coupling the asymmetric inlet particle separator 200 to the gas turbine engine 100.

With reference to FIG. 1, the secondary flow source 208 is fluidly coupled to the scavenge branch 228. In one example, the secondary flow source 208 is a blower, which may be powered by a power source associated with the rotorcraft 99. In other examples, the secondary flow source 208 may comprise an ejector or a fan. In one example, the secondary flow source 208 draws fluid into the scavenge branch 228 during all operating conditions of the gas turbine engine 100. For example, the secondary flow source 208 draws air with the entrained particles into the scavenge branch 228 during hover and low speed maneuvers, and while the gas turbine engine 100 is operating and the rotorcraft 99 is on the ground. Thus, the secondary flow source 208 ensures that particles entrained within the air entering the gas turbine engine 100 via the inlet 202 during the operation of the gas turbine engine 100 are separated even when the rotorcraft 99 is stationary. In other examples, the secondary flow source 208 may be turned off according to ambient conditions or other factors thereby halting particle separation and the associated power draw, if desired.

With continued reference to FIG. 1, with the asymmetric inlet particle separator 200 formed, via additive manufacturing, for example, the annulus 206 is coupled to the gas turbine engine 100 so as to be upstream from the inlet guide vane 120 of the compressor section 104. The secondary flow source 208 is coupled to the scavenge branch 228 so as to be in fluid communication with the scavenge branch 228 to draw air into the scavenge branch 228. With the asymmetric inlet particle separator 200 coupled to the gas turbine engine 100, during operation of the gas turbine engine 100, external or atmospheric air is drawn in through the inlet 202. With reference to FIG. 3, the particles entrained in the air are accelerated by the ramp surface 220 to the bend 238 at the throat 222. Air with entrained particles of all sizes (coarse particles greater than 100 micrometers (μm), mid-range particles 20-100 μm, and fine particles less than 20 μm) gathers near and along the outer wall 232 through the bend 238 at the throat 222, and is drawn into the downstream scavenge branch 228 by the secondary flow source 208. Air devoid of or with a substantially reduced amount of entrained particles turns at the bend 238 and flows along the inner wall 234 into the engine airflow branch 230. From the engine airflow branch 230, the air substantially devoid of entrained particles transitions to the annulus 206 and flows from the annulus 206 into the compressor section 104.

Thus, the asymmetric inlet particle separator 200 substantially removes particles entrained in the atmospheric air surrounding the rotorcraft 99 during operation of the gas turbine engine 100. By removing the particles, a life of the components associated with the gas turbine engine 100 is improved, as particle ingestion by the gas turbine engine 100 is significantly reduced. In addition, by providing the inlet 202 offset and spaced apart from the centerline 140 of the gas turbine engine 100 (FIG. 1), the asymmetric inlet particle separator 200 may take up less space in the rotorcraft 99, and may also provide a weight savings. In addition, the use of the splitter 226 downstream from the bend 238 and hidden or outside of the line of sight from the inlet 202 improves particle separation by ensuring that fine particles are also captured by the scavenge branch 228.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An asymmetric inlet particle separator for a gas turbine engine, comprising:
    an inlet having a first cross-sectional shape;
    a duct downstream of the inlet, the duct including a bend upstream from a splitter, a scavenge branch and an engine airflow branch, the splitter outside of a line of sight from the inlet and the splitter separates the scavenge branch from the engine airflow branch; and
    an annulus downstream of the engine airflow branch configured to be coupled to the gas turbine engine, the annulus having a second cross-sectional shape that is annular and defines an annulus centerline, the inlet is offset from and does not surround the annulus centerline, the engine airflow branch transitions from the first cross-sectional shape to the second cross-sectional shape at a radial distance downstream from the splitter to reduce pressure losses.

2. The asymmetric inlet particle separator of claim 1, wherein the first cross-sectional shape is rectangular.

3. The asymmetric inlet particle separator of claim 1, wherein the inlet further comprises a bellmouth defined about a perimeter of the inlet.

4. The asymmetric inlet particle separator of claim 1, wherein the duct includes a ramp surface downstream of the inlet and upstream of the bend.

5. The asymmetric inlet particle separator of claim 1, wherein the duct narrows to a throat at the bend, the bend is defined by an angle of 70 degrees to 110 degrees and the bend defines a tortuous path to the splitter from the inlet.

6. The asymmetric inlet particle separator of claim 1, further comprising a secondary flow source in fluid communication with the scavenge branch configured to draw air with entrained particles into the scavenge branch.

7. The asymmetric inlet particle separator of claim 1, wherein the inlet has an axis that is oblique to a vertical axis defined along a diameter of the annulus.

8. A gas turbine engine having a centerline, comprising:
    an inlet particle separator that is asymmetric relative to the centerline, the inlet particle separator including:
        an inlet spaced apart and offset from the centerline, the inlet has a first cross-sectional shape and the inlet is not annular about the centerline;
        a duct downstream of the inlet, the duct including a bend upstream from a splitter to define a tortuous path from the inlet to the splitter, a scavenge branch and an engine airflow branch, and the splitter separates the scavenge branch from the engine airflow branch; and
        an annulus downstream of the engine airflow branch, and the annulus is positioned about the centerline, the annulus has a second cross-sectional shape that is annular and defines an annulus centerline, the inlet is offset from and does not surround the annulus centerline, and the engine airflow branch transitions from the first cross-sectional shape to the second cross-sectional shape downstream from the splitter to reduce pressure losses.

9. The gas turbine engine of claim 8, wherein the first cross-sectional shape is rectangular.

10. The gas turbine engine of claim 8, wherein the inlet further comprises a bellmouth defined about a perimeter of the inlet.

11. The gas turbine engine of claim 8, wherein the duct includes a ramp surface downstream of the inlet and upstream of the bend, the duct narrows to a throat at the bend and the bend is defined by an angle of 70 degrees to 110 degrees.

12. The gas turbine engine of claim 8, further comprising a secondary flow source in fluid communication with the scavenge branch configured to draw air with entrained particles into the scavenge branch.

13. The gas turbine engine of claim 8, wherein the inlet has an axis that is oblique to a vertical axis defined along a diameter of the annulus.

14. The gas turbine engine of claim 8, wherein the splitter is outside of a line of sight of the inlet.

15. The gas turbine engine of claim 8, wherein a first diameter of the annulus coupled to the engine airflow branch is different than a second diameter of the annulus at an outlet of the annulus.

16. A gas turbine engine having a centerline, comprising:
   an inlet particle separator that is asymmetric relative to the centerline, the inlet particle separator including:
      an inlet spaced apart and offset from the centerline by a first radial distance, the inlet having a first cross-sectional shape and the inlet is not annular about the centerline;
      a duct downstream of the inlet, the duct including a bend upstream from a splitter to define a tortuous path from the inlet to the splitter such that the splitter is hidden from the inlet, a scavenge branch and an engine airflow branch, and the splitter separates the scavenge branch from the engine airflow branch;
      a secondary flow source in fluid communication with the scavenge branch configured to draw air with entrained particles into the scavenge branch; and
      an annulus downstream of the engine airflow branch, the annulus positioned about the centerline and having a second cross-sectional shape that is annular and defines an annulus centerline, the inlet is offset from and does not surround the annulus centerline, the engine airflow branch transitions from the first cross-sectional shape to the second cross-sectional shape at a second radial distance downstream from the splitter to reduce pressure losses, and the engine airflow branch is spaced a third radial distance from the inlet, the first radial distance greater than the third radial distance.

17. The gas turbine engine of claim 16, wherein the first cross-sectional shape is rectangular.

18. The gas turbine engine of claim 16, wherein the duct includes a ramp surface downstream of the inlet and upstream of the bend.

19. The gas turbine engine of claim 16, wherein the inlet has an axis that is oblique to a vertical axis defined along a diameter of the annulus.

20. The gas turbine engine of claim 16, wherein a first diameter of the annulus coupled to the engine airflow branch is greater than a second diameter of the annulus at an outlet of the annulus.

* * * * *